United States Patent Office 3,830,786
Patented Aug. 20, 1974

3,830,786
PROCESS FOR THE PRODUCTION OF BASIC POLYAMIDES AND COPOLYAMIDES
Kurt Findeisen, Kuno Wagner, and Friedrich Moller, Leverkusen, Germany, assignors to Bayer Aktiengesellschaft, Leverkusen, Germany
No Drawing. Continuation-in-part of abandoned application Ser. No. 163,446, July 16, 1971. This application Aug. 21, 1972, Ser. No. 282,101
Int. Cl. C08g 20/18, 20/20
U.S. Cl. 260—78 L    7 Claims

ABSTRACT OF THE DISCLOSURE

The invention relates to basic polyamides and copolyamides having a molecular weight of from 2000 to $2.5 \cdot 10^5$ obtained from 1-N-substituted hexahydro-1,4-diazepin-3- or -5-ones and to a process for production of said polyamides.

---

This application is a continuation-in-part of the now abandoned U.S. Ser. No. 163,446, filed July 16, 1971.

The present invention relates to basic polyamides and copolyamides obtained from 1-N-substituted hexahydro-1,4-diazepin-3- or -5-ones, and to a process for their production.

It is known that the affinity of polyamides for acid dyes can be increased through the incorporation of diprimary amines containing tertiary N-atoms. For example, polyamines of the kind which can be obtained by hydrogenation of the bis-cyanoethylation products of primary amines, can be condensed into the polyamide molecule. The incorporation of these diamines involves the simultaneous use of an equivalent quantity of a dicarboxylic acid. Accordingly, the proportion of non-lactam or non-aminocarboxylic acid component is increased by the quantity in which the dicarboxylic acid is used. As a result, a copolycondensate is obtained whose properties have been found to be less favourable than those of the homopolymer. For example, the softening or melting point is lower and mouldings produced from polymers of this kind exhibit lower crystallinity.

It is also known that basic polyamides can be obtained by the process described in the Belgian Patent Specification No. 717,245 or corresponding British Patent Specification No. 1,222,842 wherein ω-aminocarboxylic acids or their lactams are polycondensed hydrolytically with 0.5 to 5% by weight of a hexahydro-1-alkyl-1,4-diazepin-3-one at an elevated temperature, for example at a temperature of 260° C. The reaction time of this process ranges from 5 to 10 hours and the reaction products are discoloured. Anionic polymerisation was not possible.

Even 1-N-methyl-hexahydro-1,4-diazepinone, for example purified by repeated distillation, interferes with and inhibits the polymerisation of caprolactam which, fundamentally, proceeds very quickly. Therefore despite of the fact of being spectroscopically and analytically pure 1-N-substituted hexahydro-1,4-diazepin-3- and -5-ones can neither be polymerised nor copolymerised anionically.

It has now been found that 1-N-substituted hexahydro-1,4-diazepin-3- and -5-ones (referred to hereinafter as N-substituted azalactams) having various substituents at the basic centre of the azalactams and corresponding to the general formula

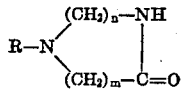

in which

R represents a substituted or unsubstituted alkyl radical with 1 to 18 carbon atoms, a substituted or unsubstituted cycloaliphatic radical, a substituted or unsubstituted aryl radical, a substituted or unsubstituted heterocyclic radical, or an amino group or dimethylamino group,
$m = 1$ or 2 and used as the activator.

can be polymerised and copolymerised anionically with conventional catalysts and co-catalysts in a smooth and surprisingly fast reaction, providing the azalactams used are distilled in the absence of oxygen and in the presence of an alkaline compound, such as sodium methoxide, potassium t-butoxide, lithium aluminium hydride, sodium hydride, aluminium triethyl, lithium butyl, sodium hydroxide or potassium hydroxide and the azalactams thus prepurified are prevented from undergoing any oxidation. The purification process has been described in the German Patent Application No. P 20 35 800.3.

Accordingly, it is possible by virtue of the invention to introduce various basic groups, differing both in nature and in quantity, into high molecular weight polyamides under relatively moderate temperature conditions and hence to vary solubility, dispersibility, affinity for acid dyes, hydrophilicity, hardness and toughness, and even to synthesise rubber-like or protein-like polyamides.

Accordingly, the present invention relates to basic homopolyamides and copolyamides having molecular weights of from 2000 to $2.5 \times 10^5$, which comprise from 4 to 100 mol percent structural units having the general formula:

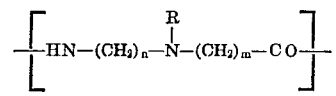

in which $m = 1$ or 2,
$m + n$ always totals 4, and
R represents a substituted or unsubstituted $C_1$ to $C_{18}$ alkyl radical, a substituted or unsubstituted cycloaliphatic radical, a substituted or unsubstituted aryl radical, a substituted or unsubstituted heterocyclic radical, or an amino group or dimethylamino group, and from 0 to 96 mol percent of structural units having the formula:

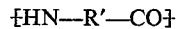

in which

R' represents a divalent radical of the formula:

in which $p = 5, 6, 7$ or 11,
or of the formula:

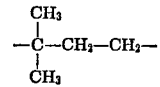

For example, R can represent a methyl, ethyl, n-propyl, isopropyl, n-butyl, isobutyl, t-butyl or stearyl radical; or an alkyl radical substituted by halogen or by a hydroxy, alkoxy, carboalkoxy, —$NH_2$, alkylamino, acyl, substituted or unsubstituted phenyl or heterocyclic radical.

Alternatively, R can represent a cyclohexyl, cyclopentyl or cyclohexenyl radical, or a cycloaliphatic radical substituted by alkyl, halogen, hydroxy, alkoxy, carboalkoxy, —$NH_2$, alkylamino, arylamino, acyl or phenyl group.

Furthermore, R can represent a phenyl radical or a phenyl radical substituted by one or more halogen, nitro, alkyl, carboalkoxy, alkoxy, acyl, sulphoxy, —$NH_2$, alkylamino, arylamino or phenyl groups.

R can also represent a substituted or unsubstituted pyridine, pyrimidine, thiophene, furan, sulpholan or piperidine radical.

The invention also relates to a process for the production of polyamides having molecular weight of from 2000 to $2.5 \times 10^5$ which comprises polymerising anionically 1-N-substituted hexahydro - 1,4- - diazepin-3- or -5-ones distilled in the absence of oxygen and in the presence of an alkaline compound and having the general formula:

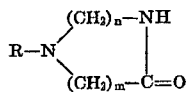

in which R, m and n have the meanings given above in the presence of a catalyst and activator at a temperature of from 80 to 200° C.

Suitable polymerisation catalysts include alkali metals, alkali metal and alkaline earth metal hydrides.

Isocyanates, masked isocyanates, especially isocyanate adducts with caprolactam, and N-acyl lactams, especially acyl caprolactams, can be used as activators.

Besides these known anionic catalysts and co-catalysts, isocyanates adducts with 1-N-substituted azalactams for example 1-N-acylazalactams are also particularly suitable cocatalysts for the polymerisation reaction.

The 1-N-substituted hexahydro - 1,4 - diazepin-3- and -5-ones used in accordance with the invention, most of which are not described in the literature, are prepared by methods known per se, for example by the process disclosed in Belgian Patent Specification No. 717,245 or the corresponding British Patent Specification 1,222,842. For example, N-substituted β-aminopropionic acid nitriles can be obtained by the cyanoethylation of monosubstituted amines and can be converted into N-substituted N-(2-cyanoethyl)-glycine esters by alkylation the nitrogen atom with α-halogenocarboxylic acid esters (A. H. Cook and K. J. Reed, Soc. (1945) 399). 1-N-substituted hexahydro-1,4-diazepin - 3 - ones can be obtained therefrom in a single reaction stage carried out under hydrogenating conditions. 1-N-substituted hexahydro - 1,4 - diazepin-5-ones can be obtained from the corresponding piperidones by Beckmann rearrangement in accordance with the process described in the literature (S. C. Dickermann, H. G. Lindwall, J. Org. Chem. 14 (1949), 530; P. S. Wadia, N-Awand, J. Sci. Ind. Research 17 b (1958), 31).

Another method of preparing the azalactams is to react N-substituted β-aminopropionic acid esters with formaldehyde/hydrocyanic acid to give N-substituted N-(cyanomethyl) - β - alanine esters which readily form the required hexahydrodiazepinones under hydrogenating conditions as described in Belgian Patent Specification No. 717,245 or corresponding British Patent Specification No. 1,222,842.

The following 1-N-substituted hexahydro-1,4-diazepin-3- and -5-ones are particularly preferred anionically polymerisable:

1-N-methyl-hexahydro-1,4-diazepin-3-one;
1-N-ethyl-hexahydro-1,4-diazepin-3-one;
1-N-n-propyl-hexahydro-1,4-diazepin-3-one;
1-N-isopropyl-hexahydro-1,4-diazepin-3-one;
1-N-n-butyl-hexahydro-1,4-diazepin-3-one;
1-N-isobutyl-hexahydro-1,4-diazepin-3-one;
1-N-t-butyl-hexahydro-1,4-diazepin-3-one;
1-N-stearyl-hexahydro-1,4-diazepin-3-one;
1-N-cyclohexyl-hexahydro-1,4-diazepin-3-one;
1-N-phenyl-hexahydro-1,4-diazepin-3-one;
1-N-benzyl-hexahydro-1,4-diazepin-3-one;
1-N-(3-methoxypropyl)-hexahydro-1,4-diazepin-3-one;
1-N-carbethoxy-hexahydro-1,4-diazepin-3-one;
1-N-(3-aminopropyl)-hexahydro-1,4-diazepin-3-one;
1-N-[5-(1,1,3-trimethylcyclohexane)]-hexahydro-1,4-diazepin-3-one;
1-N-methyl-hexahydro-1,4-diazepin-5-one;
1-N-ethyl-hexahydro-1,4-diazepin-5-one;
1-N-n-propyl-hexahydro-1,4-diazepin-5-one;
1-N-isopropyl-hexahydro-1,4-diazepin-5-one;
1-N-n-butyl-hexahydro-1,4-diazepin-5-one;
1-N-isobutyl-hexahydro-1,4-diazepin-5-one;
1-N-t-butyl-hexahydro-1,4-diazepin-5-one;
1-N-cyclohexyl-hexahydro-1,4-diazepin-5-one;
1-N-benzyl-hexahydro-1,4-diazepin-5-one;
1-N-(3-methoxypropyl)-hexahydro-1,4-diazepin-5-one;
1-N-[5-(1,1,3-trimethylcyclohexane)]-hexahydro-1,4-diazepin-5-one; or
1-N-dimethylamino-hexahydro-1,4-diazepin-5-one.

They are also of particular interest for carrying out copolymerisation with caprolactam, even in binary, ternary and quarternary mixtures of the following combinations of monomers.

The following pairs of monomers, both -3-ones and -5-ones, are particularly suitable for copolymerisation to product purely basic polyamides:

1-N-cyclohexylazalactam - 1-N-ethylazalactam.
Do -- 1-N-n-propylazalactam.
Do -- 1-N-isopropylazalactam.
Do -- 1-N-n-butylazalactam.
Do -- 1-N-isobutylazalactam.
Do -- 1-N-cyclohexylazalactam.
Do -- 1-N-[5-(1,1,3 - trimethylcyclohexane)]-azalactam.
Do -- 1-N-benzylazalactam.
1-N-methylazalactam -- 1-N-n-propylazalactam.
Do -- 1-N-isopropylazalactam.
Do -- 1-N-n-butylazalactam.
Do -- 1-N-isobutylazalactam.
Do -- 1-N-cyclohexylazalactam.
Do -- 1-N-benzylazalactam.
1-N-ethylazalactam -- 1-N-n-butylazalactam.
Do -- 1-N-isobutylazalactam.
Do -- 1-N-cyclohexylazalactam.
Do -- 1-N-benzylazalactam.
1-N-n-propylazalactam -- 1-N-butylazalactam.
Do -- 1-N-isobutylazalactam.
Do -- 1-N-cyclohexylazalactam.
Do -- 1-N-benzylazalactam.
1-N-isopropylazalactam - 1-N-cyclohexylazalactam.
Do -- 1-N-benzylazalactam.
1-N-n-butylazalactam -- 1-N-cyclohexylazalactam.
Do -- 1-N-benzylazalactam.
and
1-N-isobutylazalactam -- 1-N-benzylazalactam.

The following ternary and quarternary monomer mixtures are particularly suitable for copolymerisation to produce purely basic polyamides:

| N-methyl-, | 1-N-n-butyl-, | 1-N-cyclohexylazalactam |
|---|---|---|
| -N-methyl-, | 1-N-isobutyl-, | 1-N-cyclohexylazalactam |
| -N-methyl-, | 1-N-n-butyl-, | 1-N-benzylazalactam |
| 1-N-methyl-, | 1-N-isobutyl-, | 1-N-benzylazalactam |
| 1-N-n-propyl-, | 1-N-ethyl-, | 1-N-benzylazalactam |
| 1-N-isopropyl-, | 1-N-ethyl-, | 1-N-benzylazalactam |
| 1-N-methyl-, | 1-N-cyclohexyl-, | 1-N-benzylazalactam |
| 1-N-n-butyl-, | 1-N-[5-(1,1,3-trimethylcyclohexaneth)]-, | 1-N-benzylazalactam |
| 1-N-isobutyl-, | 1-N-[5-(1,1,3-trimethylcyclohexane)]-, | 1-N-benzylazalactam |
| -N-methyl-, | 1-N-butyl-, | 1-N-cyclohexyl |
| -N-methyl-, | 1-N-butyl-, | 1-N-benzylazalactam |

The physical properties and more particularly the solubility and softening point of the copolymers can be greatly varied and influenced.

From the group of known, non-basic lactams, the following are particularly suitable for copolymerisation of the aforementioned basic lactams in amounts from 0 to 98 mol percent; ε-caprolactam, oenanthic lactam, caprylic lactam, lauric lactam; if desired, 3,3 - dimethyl propiolactam can also be used.

If desired, bifunctional azalactams, for example 1-N,N'-(hexamethylene - 1,6) - di - (hexahydro - 1,4 - diazepin- 3-one), 1 - N,N' - (ethylene-1,2) - di - (hexahydro - 1,4-diazepin-5-one), can be added in small quantities, in order to produce branched or crosslinked polyamides.

The polymerisation reaction can be carried out by block polymerisation, by solution polymerisation using inert solvents (for example toluene, xylene, chlorobenzene, or aliphatic hydrocarbons) or by suspension polymerisation with conventional anionic catalysts at temperatures of preferably from 80 to 200° C., more preferably from 115 to 150° C.

Known co-catalysts can be used to carry out the high velocity polymerisation reaction, for example a variety of different aliphatic, cycloaliphatic, araliphatic or aromatic isocyanates or polyisocyanates, or adducts thereof with caprolactam, N-acyl derivatives of caprolactam, N,N-di-substituted carbamoyl caprolactams, caprolactam-N-carboxylic acid esters, carbodiimides such as diisopropyl carbodiimide, diisobutyl, carbodiimide, diisooctyl carbodiimide or dicyclohexyl carbodiimide, cyanamides such as N,N - dimethyl cyanamide, N - cyclohexyl - N - methyl cyanamide, N,N - dicyclohexyl cyanamide, N-phenyl-N-methyl cyanamide and N,N-diphenyl cyanamide, or novel hitherto unknown co-catalysts, for example isocyanate adducts of azalactams. Particularly suitable adducts are those of tetramethylene diisocyanate, hexamethylene diisocyanate, tris-isocyanato-hexyl biuret, m-xylylene diisocyanate, isophorone diisocyanate, lysine ester diisocyanate, 4,4' - diisocyanato - diphenylmethane, and 1-methylbenzene-2,4- or -2,6-diisocyanate, or NCO-group-containing adducts thereof with diols and triols, such as ethylene glycol, 1,4-butane diol, 1,3-propylene glycol, hexane diol, glycerol and trimethylol propane.

To carry out polymerisation or copolymerisation of the aforementioned azalactams and lactams, the separately purified, dried and fused azalactam, or a mixture of azalactam and lactam with one of the aforementioned activating compounds or with a mixture of several of these compounds, preferably in a quantity of from about 0.01 to 4% by weight (based on the quantity of azalactam and lactam used), is mixed with an alkaline reaction accelerator and the resulting mixture is kept at the required polymerisation temperature. Rapid polymerisation of the azalactam or azalactam/lactam mixture begins after only a short time, progressing rapidly to high molecular weight polymers.

The novel polymers and copolymers have surprising properties. Depending on the monomers used, they are distinguished either by a rubber-like behaviour, in which case they can be processed on rubber mixing rolls, or by forming hard though and elasticised polyamides.

The hydrophilicity of the novel products can be controlled. In addition, they show a surprisingly high power of adhesion and can be bonded very firmly to glass, wood and cloth substrates.

The novel polymers and copolymers show a particularly high affinity for acid dyes coupled inter alia with outstanding receptivity to pigments.

Compared with conventional polyamides, they show increased solubility, which can be increased by further reactions such as quaternisation (for example with methylene chloride or dimethyl sulphite), methylolation and etherification reactions or salt formation with organic or inorganic monofunctional or polyfunctional acids on the basic N-atoms; aqueous or aqueous-alcoholic dispersions can also readily be prepared.

In addition, the products obtained by the process according to the invention can be used for a variety of different applications, for example for the production of films, coatings, adhesives, fibers and microporous sheet structures.

EXAMPLE 1

A solution of 750 g. of N-methyl-N-(2-cyanoethyl)-glycine ethyl ester (prepared from methylamino-propionitrile and ethyl chloroacetate) in 1 litre of ethanol was hydrogenated in an autoclave in the presence of 60 g. of Raney cobalt at a temperature of 80 to 90° C. and under a pressure of 100 to 120 atms. After about 1 hour, the calculated quantity of hydrogen had been absorbed. The hydrogenated solution was filtered off from the catalyst. The solid residue left after the ethanol had been filtered off was freed with a little ethyl acetate from any greases adhering to it, and the white product which did not show any tendency to discolour in air was fractionated in a high vacuum with 5 g. of sodium methoxide. The distillate obtained had a melting point of 91° C.

Yield: 424 g. (75% of the theoretical).

The 1-N-methyl-hexahydro - 1,4 - diazepin - 3 - one thus obtained ws polymerisable.

140 g. of 1-N-methyl-hexahydro - 1,4 - diazepin-3-one, treated as described above, was pre-distilled with 300 mg. of sodium methoxide in a high vacuum of 0.05 to 0.1 mm. Hg. After 15 to 20 g. of the 1-N-methyl azalactam had distilled over, distillation was stopped, the sump temperature being in the range from 115 to 125° C. The polymerisation apparatus was flushed with nitrogen, and 3 g. of co-catalyst were introduced into it at 130 to 135° C. in the presence of nitrogen. The adduct of hexamethylene diisocyanate with 2 mols of caprolactam was used as co-catalyst. Polymerisation began after a few seconds and was complete after approximately 5 minutes. The polymerisation reaction was exothermic and, in the absence of cooling, the reaction temperature rose to 155° C.

The polymer thus prepared had a relative viscosity of $\eta=1.8095$ (measured of a solution of 1 g. polymers/100 ml. at 25° C.).

EXAMPLE 2

140 g. of caprolactam and 750 mg. of sodium methoxide were pre-distilled in a water-jet vacuum. 18.5 g. of first runnings were removed. 30 g. of 1-N-butyl-hexahydro-1,4-diazepin-3-one, purified in accordance with Example 1, and 300 ml. of chlorobenzene were then introduced under nitrogen. Copolymerisation was initiated with a co-catalyst consisting of hexamethylene diisocyanate and 1-N-butyl-hexahydro-1,4-diazepin - 3 - one at a temperature of 130 to 135° C. A granular, readily filterable polymer was obtained by way of different intermediate stages. The yield was 124 g. (82% of the theoretical).

$N_2$ determination: 13.4%
Relative viscosity: $\eta=1.7427$ (measured as in Example 1)

EXAMPLE 3

120 g. of caprolactam and 600 mg. of sodium methoxide were pre-distilled in a water-jet vacuum and, after 20.1 g. of first runnings had been removed, the vessel was flushed with nitrogen. Following the addition of 50 g. of 1-N-benzyl-hexahydro - 1,4 - diazepin-3-one, purified in accordance with Example 1, 230 ml. of chlorobenzene and 100 ml. of triisobutylene, the internal temperature was increased to 135° C. and 5 g. of the co-catalyst of hexamethylene diisocyanate and 2 mols of caprolactam were added under nitrogen. The polymerisation reaction began immediately and a granular white copolymer was precipitated. After filtration, followed by removal of the catalyst, a copolymer was obtained in a yield of 128 g. (85.5% of the theoretical).

Relative viscosity: $\eta=2.1346$ (measured as in Example 1)

EXAMPLE 4

Following purification in accordance with Example 1, 50 g. of 1-N-methyl-hexahydro-1,4-diazepin-3-one, 50 g. of 1-N-benzyl-hexahydro-1,4-diazepin-3-one, 50 g. of 1-N-butyl-hexahydro-1,4-diazepin-5 - one were mixed with 500 mg. of sodium methoxide, followed by careful pre-distillation in a high vacuum. After flushing with nitrogen, 5 g. of co-catalyst, comprising the adduct of tetramethylene diisocyanate with 2 mols of 1-N-methyl-hexahydro-1,4-diazepin-3-one, were added, and polymerisation began at 140° C. A viscous copolymerisation block was obtained after a few minutes.

The copolymer thus prepared had a relative viscosity of $\eta = 3.0049$ (measured as in Example 1).

EXAMPLE 5

Ternary copolyamides, prepared under the same conditions as in Example 1, were obtained from the following monomer mixtures, after purification in accordance with Example 1.

Percent by weight
30% by weight 1-N-methylazalactam (a)
Caprolactam _____ 63
1-N-t-butylazalactam _____ 7

(b)
Caprolactam _____ 64
1-N-benzlazalactam _____ 6

(c)
Caprolactam _____ 61
1-N-t-butylazalactam _____ 9

(d)
Caprolactam _____ 63
1-N-phenylazalactam _____ 7

(e)
Caprolactam _____ 62
1-N-cyclohexylazalactam _____ 8

(f)
Caprolactam _____ 65
1-N-(sulpholan-3)-azalactam _____ 5

(g)
Caprolactam _____ 61
1-N-ethylazalactam _____ 9

(h)
Caprolactam _____ 64
1-N-(N'-dimethylamino)-azalactam _____ 6

(i)
Caprolactam _____ 62
1-N-(3-aminopropyl)-azalactam _____ 8

(j)
Caprolactam _____ 62
1-N-(3-morpholinopropyl)-azalactam _____ 8

(k)
Caprolactam _____ 65
1-N-(sulpholan-3)-azalactam _____ 5

(l)
Caprolactam _____ 61
1-N-(pyridine-2)-azalactam _____ 9

Relative viscosity (measured as in Example 1):

|     | I      | II     |
|-----|--------|--------|
| (a) | 1.3211 | 1.4238 |
| (b) | 1.8245 | 1.7563 |
| (c) | 1.9321 | 1.6351 |
| (d) | 1.7343 | 1.8541 |
| (e) | 2.0138 | 1.9241 |
| (f) | 1.2431 | 1.4326 |
| (g) | 2.1051 | 1.7384 |
| (h) | 1.0121 | 1.345  |
| (i) | 1.2431 | 1.1764 |
| (j) | 1.6432 | 1.7343 |
| (k) | 1.5382 | 1.3126 |
| (l) | 1.7248 | 1.8235 |

The first column I relates to the 1-N-substituted hexahydro-1,4-diazepin-3-ones and the second column II to the 1-N-substituted hexahydro-1,4-diazepin-5-ones.

EXAMPLE 6

A 15% by weight solution, in trichloroethanol as solvent, was prepared from the copolymer of Example 3. The colourless solution obtained showed outstanding storage stability. After the solution had been applied to wood, metal or cloth substrates, and the solvent evaporated off, transparent firmly adhering films were obtained which showed increased adhesion compared with pure polycarprolactam films.

If the polyazalactam obtained in Example 5 was used, a rubber-like film was obtained, which showed outstanding adhesion to glass and which could be used in the production of safety glass and composite glass.

EXAMPLE 7

130 g. of caprolactam and 700 mg. of sodium methoxide were pre-distilled in a water-jet vacuum and, after 17 g. of first runnings had been removed, the vessel was flushed with nitrogen. Following the addition of 3,5 g. 1-N-methyl-hexahydro-1,4-diazepin-3-one, purified in accordance with Example 1 and 300 ml. of chlorobenzene, the internal temperature was increased to 135° C. and 5,5 g. of the co-catalyst of hexamethylene diisocyanate and mols of caprolactam were added under nitrogen. The polymerisation reaction began immediately and a white copolymer was precipitated. After filtration, followed by removal of the catalyst, a copolymer was obtained in a yield of 99 g. (85% of the theoretical). Relative viscosity: $\eta = 1.9346$ (measured as in Example 1).

Comparison Example 1

130 g. of caprolactam and 700 mg. of sodium methoxide were pre-distilled in a water-jet vacuum and, after 17 g. of first running had been removed, the vessel was flushed with nitrogen. Following the addition of 3,5 g. of 1-N-methyl-hexahydro-1,4-diazepin - 3 - one, purified by repeated distillation and spectroscopically pure, and 300 ml. of chlorobenzene, the internal temperature was increased to 135° C. and 5,5 g. of the co-catalyst of hexamethylene diisocyanate and 2 mols of caprolactam were added under nitrogen. The polymerisation did not begin and even after several hours no increase of the viscosity could be observed.

Comparison Example 2

130 g. of caprolactam, 3,5 g. of 1-N-methyl-hexahydro-1,4-diazepin-(3) and 26 g. of $H_2O$ were polycondensed for one hour at 180° C., for one hour at 220° C. and for 5 hours at 260° C. under nitrogen. The product was coloured.

We claim:
1. A process for the production of film- and fiber-forming polyamides which comprises anionically polymerising 1-N-substituted hexahydro-1,4-diazepin-3- or -5-ones, 1-N-substituted azalactams, distilled in the absence of oxygen and in the presence of an alkaline compound and having the general formula:

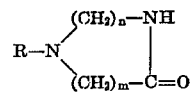

in which

R represents a substituted or unsubstituted $C_1$ to $C_{18}$ alkyl radical, a substituted or unsubstituted cycloaliphatic radical, a substituted or unsubstituted aryl radical, an unsubstituted heterocyclic radical, or an amino group or dimethylamino group, $m = 1$ or 2, and $m$ and $n$ together always total 4, in the presence of an alkaline catalyst and activator at a temperature of from 80 to 200° C.

2. A process as claimed in claim 1 wherein the 1-N-substituted azalactams used are 1-N-methylazalactam, 1-N-ethylazalactam, 1-N-propyl-azalactam, 1-N-isopropyl-azalactam, 1 - N - n - butyl-azalactam, 1-N-isobutyl-azalactam, 1-N-t-butyl-azalactam, 1-N-stearyl-azalactam, 1-N-cyclohexyl-azalactam, 1-N-phenyl-azalactam, 1-N-benzylazalactam, 1 - N - (3-methoxypropyl)-azalactam, 1-N-carbethoxy-azalactam, 1-N-(3-aminopropyl)-azalactam, 1-

N-[5-(1,1,3-trimethylcyclohexane-)]-azalactam, 1-N-dimethylamino-azalactam.

3. A process as claimed in claim 1 wherein binary, ternary and quaternary mixture of said monomers are copolymerised.

4. A process as claimed in claim 1 wherein non-basic lactams are copolymerised.

5. A process as claimed in claim 1 wherein the non-basic lactams are ε-caprolactams oenanthic lactams, caprylic lactams, lauric lactams or 3,3-dimethyl-propiolactams.

6. A process as claimed in claim 1 wherein an isocyanate adduct with a 1-N-substituted azalactam is used as the activator.

7. A process as claimed in claim 1 wherein an isocyanate adduct with a 1-N-substituted acyl azalactam is used as the activator.

References Cited
FOREIGN PATENTS 1,570,340    4/1969  France _____ 260—78 L LUCILLE M. PHYNES, Primary Examiner U.S. Cl. X.R.

260—33.4

UNITED STATES PATENT OFFICE
CERTIFICATE OF CORRECTION

PATENT NO. : 3,830,786
DATED : August 20, 1974
INVENTOR(S) : Kurt Findeisen et al.

It is certified that error appears in the above-identified patent and that said Letters Patent are hereby corrected as shown below:

| COLUMN | LINE | ERROR |
| --- | --- | --- |
| 2 | 5 | "used as the activator" should be deleted and insert --- m and n together always total 4, ---. |
| 3 | 5 | "weight" should be --- weights ---. |
| 4 | 21 | "cyclohexylazalactam" should be --- methylazalactam ---. |
| 4 | 30 | "methylazalactam" should be --- ethylazalactam ---. |
| 4 | 36 | "1-N-ethylazalactam" should be --- 1-N-n-propylazalactam ---. |
| 4 | 40 | "1-N-n-propylazalactam" should be --- 1-N-isopropylazalactam ---. |
| 4 | 44 | "1-N-isopropylazalactam" should be --- 1-N-n-butylazalactam ---. |

UNITED STATES PATENT OFFICE
CERTIFICATE OF CORRECTION

PATENT NO. : 3,830,786
DATED : August 20, 1974
INVENTOR(S) : Kurt Findeisen et al.

It is certified that error appears in the above-identified patent and that said Letters Patent are hereby corrected as shown below:

PAGE - 2

| COLUMN | LINE | ERROR |
|---|---|---|
| 4 | 46 | "1-N-n-butylazalactam" should be --- 1-N-isobutylazalactam ---. |
| 4 | 49 | "1-N-isobutylazalactam" should be --- 1-N-cyclohexylazalactam ---. |
| 4 | 55 | "N-methyl-," should be --- 1-N-methyl-, ---. |
| 4 | 56 | "N-methyl-,: should be --- 1-N-methyl-, ---. |
| 4 | 57 | "N-methyl-," should be --- 1-N-methyl-, ---. |
| 6 | 15 | "ws" should be --- was ---. |
| 4 | 64 | "-N-methyl-," should be --- 1-N-methyl-, --- |
| 4 | 65 | "-N-methyl-," should be --- 1-N-methyl-, --- |
| 7 | 32 | "sulpholan-3)-azalactam" should be --- stearylazalactam ---. |
| 8 | 18 | After the word "and" insert the number --- 2 ---. |

Signed and sealed this 10th day of June 1975.

(SEAL)
Attest:

RUTH C. MASON
Attesting Officer

C. MARSHALL DANN
Commissioner of Patents
and Trademarks